(12) United States Patent
Schmidt

(10) Patent No.: US 6,835,261 B2
(45) Date of Patent: Dec. 28, 2004

(54) ADHESIVE-INFUSED 3-D WOVEN TEXTILE PREFORMS FOR STRUCTURAL JOINTS

(75) Inventor: Ronald P. Schmidt, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 5 days.

(21) Appl. No.: 09/898,633

(22) Filed: Jul. 2, 2001

(65) Prior Publication Data

US 2003/0000641 A1 Jan. 2, 2003

(51) Int. Cl.$^7$ .......................... B32B 7/08; B32B 31/20; B29C 65/02
(52) U.S. Cl. .................. 156/92; 156/304.5; 156/306.9; 156/307.3; 156/307.7; 52/729.2; 52/729.5; 52/731.1; 52/735.1
(58) Field of Search ........................... 156/91, 92, 156, 156/215, 304.1, 304.3, 304.5, 306.6, 306.9, 307.3, 307.7, 152, 230, 234, 241, 247, 249, 344, 540, 541, 584, 598; 52/729.2, 729.5, 735.1, 731.1; 244/87, 119, 120, 123, 131; 117/915; 438/455, 456, 457, 458, 464, 977, 107; 269/21; 414/935, 937, 939, 941

(56) References Cited

U.S. PATENT DOCUMENTS

| | | | | |
|---|---|---|---|---|
| 3,639,189 A | * | 2/1972 | Hartman ...................... | 428/462 |
| 3,693,670 A | * | 9/1972 | Meyres ...................... | 139/196.1 |
| 4,091,125 A | * | 5/1978 | Delgadillo .................... | 427/96 |
| 4,900,048 A | * | 2/1990 | Derujinsky .............. | 280/281.1 |
| 6,374,570 B1 | * | 4/2002 | McKague, Jr. ................ | 52/762 |

OTHER PUBLICATIONS

*Composite Structures, Theory and Practice*, Owens et al., published 2000; Editors: Peter Grant and Carl Q. Rosseau.
*Primary Sandwich Structure, A Unitized Approach*; Sheahen et al.; copyright 2000 by Lockheed Martin; Published by the American Institute of Aeronautics and Astronauts, Inc.; pp. 1–8.

*Robust Composite Sandwich Structures*; Sheahen et al.; copyright 1998 by Lockheed Martin; Published by the American Institute of Aeronautics and Astronauts, Inc.; pp. 1–12.

*Affordable Composite Structure for Next Generation Fighters*; Bersuch et al.; copyright 1998 by Lockheed Martin; published by Society for the Advancement of Material and Process Engineering; pp. 1–11.

*Interlaminar Reinforced Composites Development for Improved Damage Tolerance*; Wanthal et al; copyright 200 by the Boeing Company, Lockheed Martin; Northrop Grunman; Society for the Advancement of Material and Process Engineering; 15 pages.

*3–D Composites in Primary Aircraft Structure Joints*;; Bersuch et al.; published Jan. 1997 AGARD Bolted/Bonded Joints in Polymeric Composites; pp. 16–1–16–10.

*Affordable 3–D Integrated Composite Structures*; Sheahen et al.; copyright 200 by Lockheed Martin; published by the Universal Technology Corporation; 20 pages.

\* cited by examiner

Primary Examiner—Sue A. Purvis
Assistant Examiner—Sing P Chan
(74) Attorney, Agent, or Firm—Bracewell & Patterson, L.L.P.

(57) ABSTRACT

A method for using a three-dimensional, woven preform to assemble two components. The woven preform is infused with an adhesive, and at least one surface of the preform is bonded to at least one surface of one of the components using the adhesive within the preform. The other of the components is attached to the preform, and this may occur with fasteners after the adhesive is cured or by bonding the second component to the preform with the adhesive. Use of an adhesive, instead of a resin, creates a stronger joint, especially with fiber-reinforcement of the adhesive. The thickness of the compressible, three-dimensional weave provides for a larger dimensional tolerance at each bond line.

9 Claims, 1 Drawing Sheet

ADHESIVE-INFUSED 3-D WOVEN TEXTILE PREFORMS FOR STRUCTURAL JOINTS

BACKGROUND OF THE INVENTION

1. Field of the Invention

This invention generally relates to assembly of components using woven preforms and particularly relates to assembly of components into structural joints using adhesive-infused preforms.

2. Description of the Prior Art

Typically, laminating resins are used as the matrix material in woven textiles, this also being true for woven preforms used to connect components made of composites or other materials. An example of a commonly-used laminating resin is 977-3, available from Cytec Industries, Inc., of West Paterson, N.J. The laminating resin is infused into a textile product and is cured to form a polymer matrix in the finished composite component. When assembling a joint using a preform, the preform may be co-cured along with uncured composite components or the components may be cured prior to assembly using an uncured preform. Because of the inferior bonding characteristics of laminating resins, an layer of adhesive is placed between the preform and the components. Generally, an adhesive film is used, which is expensive and adds to fabrication time.

To achieve proper bonding when using adhesive film between pre-cured components, special attention must be paid to the interface at the adhesive layer. This bond line is critical, and, where two surfaces are brought together, the distance between the surfaces must be within a critical tolerance to ensure a proper bonding layer. The thickness of the adhesives are usually about 0.015" thick with a bond layer tolerance of +/−0.005".

Therefore, a need exists for an improved method that reduces the steps in assembly and provides for a stronger joint when joining components using a woven preform. A further need exists for a method of joining components in a structural joint that provides for a larger dimensional tolerance between components when using an adhesive at the bond line.

SUMMARY OF THE INVENTION

A method uses a three-dimensional, woven preform to assemble two components. The woven preform is infused with an adhesive, and at least one surface of the preform is bonded to at least one surface of one of the components using the adhesive within the preform. The other of the components is attached to the preform, and this may occur with fasteners after the adhesive is cured or by bonding the second component to the preform with the adhesive. Use of an adhesive, instead of a resin, creates a stronger joint, especially with fiber-reinforcement of the adhesive. The thickness of the compressible, three-dimensional weave provides for a larger dimensional tolerance at each bond line.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
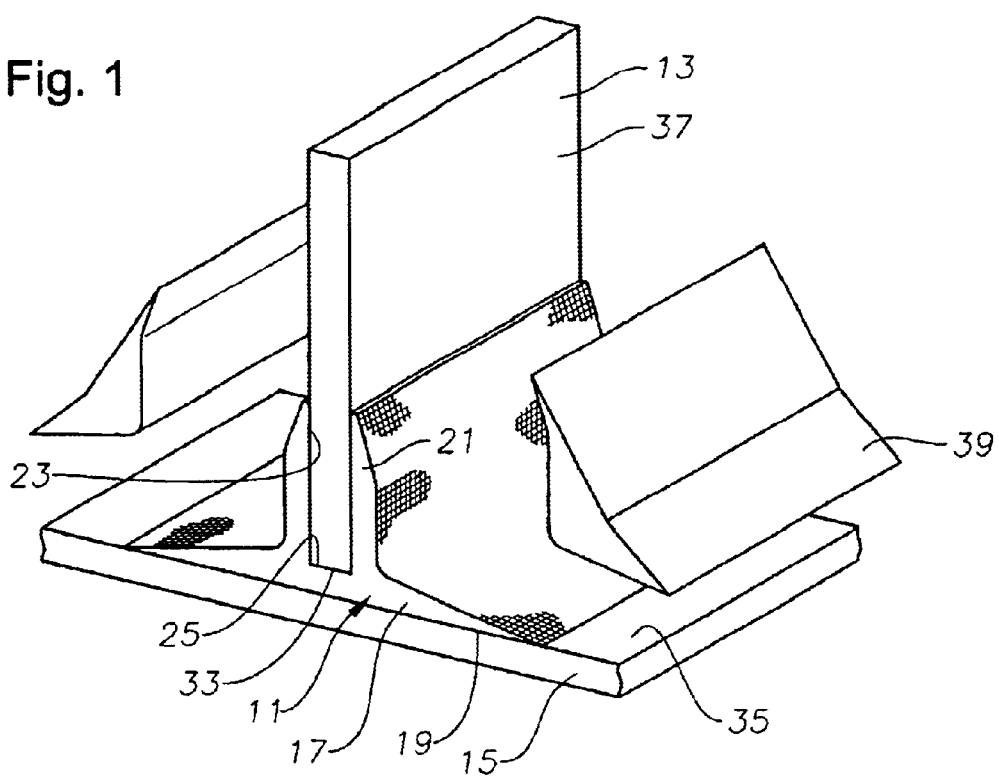
FIG. 1 is a perspective view of an assembly using a preform and in accordance with the present invention.

The present invention provides for infusing a resin-free preform with an epoxy-based adhesive to form the matrix. FIGS. 1 through 5 illustrate the preferred embodiments of an adhesive-infused, three-dimensional (3-D), woven textile preform used for assembling parts into structural joints. The preferred adhesive is FM® 300, also available from Cytec Industries, Inc., but other adhesives will work, providing the adhesive can be infused in a way that properly "wets out," or saturates, the fiber bundles in the preform.

Various resin systems are sold under the terms "laminating resins" and "adhesives," though there is no "bright-line," industry-standard definition by which to distinguish one from the other. The term "adhesive," as used herein, is meant as a resin system that has a lower modulus of elasticity and/or a higher strain-to-failure than the resin forming the matrix of the parts to be adhered. The combination of these characteristics is described as higher toughness, and adhesives have a higher toughness than laminating resins, which tend to be more brittle and have lower crack-formation loads.

Results from ASTM tests can be used to distinguish, generally, between laminating resins and adhesives. High-strength, structural laminating resins have a peel strength rating generally ranging from 0–15 pounds per linear inch, whereas the peel strength of adhesives are greater than 15 pounds per linear inch. For example, the Bell Peel test (ASTM D3167 "Standard Test Method for Floating Roller Peel Resistance of Adhesives") shows that the peel strength of FM® 300 is 23–29 pounds per linear inch at room temperature, but the peel strength of 977-3, which is used to laminate the parts, is 0–6 pounds per linear inch. In addition, laminating resins generally have a tensile strength greater than 7500 pounds per square inch (psi) as tested using ASTM D638 ("Standard Test Method for Tensile Properties of Plastics"), with high-strength resins ranging to 12000 psi. Adhesives generally have tensile strengths less than 6500 psi. Thus, in the present application, "adhesives" also means resin systems with tensile strengths less than 6500 psi and a peel strength greater than 15 pounds per linear inch. "Laminating resins" is used to mean resin systems having tensile strengths greater than 7500 psi and a peel strength of less than 15 pounds per linear inch.

To provide higher strain-to-failure characteristics, epoxy-based adhesives usually have rubber modifiers added to them. The higher strain capability improves load distribution through the preform, reducing the crack formation at the outer edges of the bond lines and in the weave that can lead to catastrophic failure of the joint at loads less than those which would cause failure of the parts. Also, adhesives usually have a higher viscosity than laminating resins. Laminating resins easily saturate woven components, whereas adhesives require an infusion process to wet-out the fiber bundles.

The preforms can be infused with adhesive in many ways, though the preferred method is drawing preforms through a tank containing adhesive dissolved in a solvent, usually acetone or toluene. The preforms are immersed in the solution, then removed from the tank. The solvent is allowed to evaporate, or "flash off," leaving the adhesive in the preform. To completely wet-out the preforms, this process may be repeated several times. The preform is saturated with the adhesive and is laid up while uncured.

Figure 4:
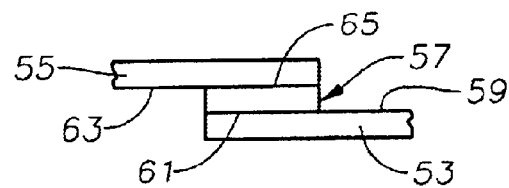
FIG. 4 is a front view of a third embodiment of the present invention.
Figure 5:
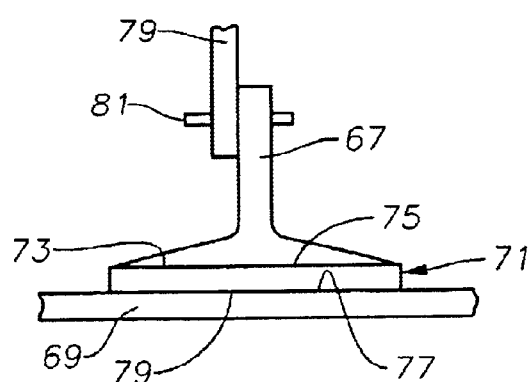
FIG. 5 is a front view of a fourth embodiment of the present invention.

The parts, or components, to be joined may be formed from composites and may be cured or uncured, or the parts may be formed from other materials, e.g., plastics, metals, etc. If joining uncured composite parts, the entire assembly can be co-cured. However, a disadvantage to using uncured parts is that more elaborate and expensive tooling is required to create dimensionally-accurate parts. The preforms can be used as a connector (FIGS. 1 through 3) or as a bond ply (FIGS. 4 and 5).

Referring to the figures, FIG. 1 shows a pi-shaped, 3-D, woven preform 11 used to connect two pre-cured, composite, detail parts 13, 15, which may be, for example, a frame member 13 and a skin 15. Preform 11 has a base 17 on its lower portion that has a continuous, flat lower surface 19. A pair of spaced-apart planar legs 21 extend vertically upward from base 17. Each leg 21 is at a position that is offset from, but near to, the center of base 17. Legs 21 are parallel to each other and generally perpendicular to base 17. In the installed position, inner surfaces 23 of legs 21 face each other for receiving frame member 13. A small, upward-facing surface 25 of base 17 lies between the lower ends of legs 21. Though it is preferable for the outer surface of legs 21 and the upper surface of base 17 to be tapered at their outer ends, as shown, the ends may also be squared.

Figure 2:
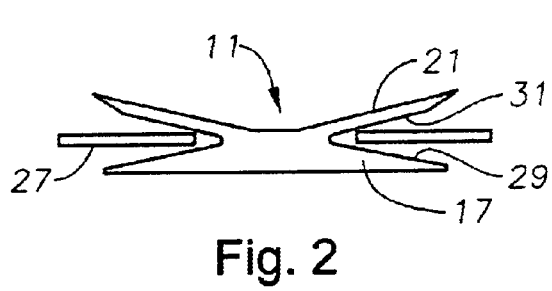
FIG. 2 is a front view of the preform of FIG. 1 prior to installation.

FIG. 2 shows the method used after infusion and prior to installation to keep legs 21 from adhering to the base 17. A non-stick separator film 27 is laid on the upper surface 29 of base 17, and each leg 21 is laid over on film 27. The outer surface 31 of each leg 21 is in contact with film 27, not with upper surface 29 of base 17. Separator film 31 is removed prior to installation of preform 11.

Referring again to FIG. 1, to connect parts 13, 15, frame member 13 is placed between inner surfaces 23 of legs 21, lower edge 33 of frame member 13 contacting upward-facing surface 25. Lower surface 19 of preform 11 is placed against upper surface 35 of skin 15 in the desired position. The adhesive forms a bonding layer at the interface of inner surfaces 23 of legs 21 and outer surfaces 37 of frame member 13 and at the interface of lower surface 19 of preform 11 and upper surface 35 of skin 15.

To ensure consistent bonding at the interfaces, the assembly is placed within a vacuum bag (not shown), from which the air is drawn, allowing outside air pressure to apply force to preform 11. Soft, silicone tooling, such as over-presses 39, is normally used against preform 11 within the vacuum bag to distribute the forces evenly across preform 11. If the adhesive is a heat-cured adhesive, the assembly is then placed in an autoclave, or heat is applied through other means, to cause the rapid curing of the adhesive. Alternatively, adhesives used in preform 11 may be cured by other types of cure mechanisms, for example, electron-beam curing.

Figure 3:
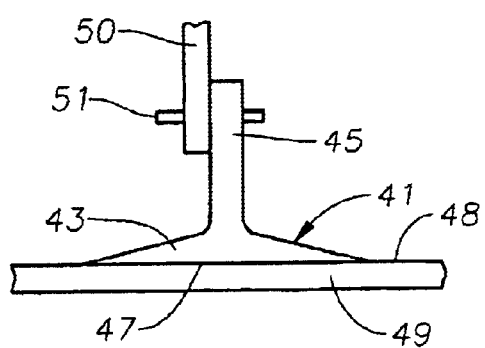
FIG. 3 is a front view of a second embodiment of the present invention.

In FIG. 3, 3-D woven preform 41 is T-shaped, having a base 43 and a single vertical leg 45. Preform 41 is infused with adhesive, and lower surface 47 is placed in contact with upper surface 48 of cured piece 49 formed from composites. The assembly is vacuum-bagged, and semi-rigid tooling (not shown) is used to support leg 45 while adhesive is cured. A bond layer forms from the adhesive at the interface of surfaces 47, 48, whereas leg 45 is cured in an upright position. A separate member 50 can be connected to piece 49 by attaching to leg 45, normally with a fastener 51 passing through the thickness of leg 45.

FIGS. 4 and 5 illustrate the larger dimensional tolerance available with the use of 3-D preforms as bond plies. FIG. 4 shows a connection of two planar pieces 53, 55 in shear using an adhesive-infused, 3-D, woven preform 57 having a rectangular cross-section and no tapered edges. Upper surface 59 of lower piece 53 is in contact with lower surface 61 of preform 57, as is lower surface 63 of upper piece 55 with upper surface 65 of preform 57. Bond layers form at these interfaces, connecting pieces 53, 55. Because the adhesive is infused in preform 57 having a selected thickness, the bond layer tolerance is increased, preform 57 allowing a larger variation in distance between pieces 53, 55. Without preform 57, the distance between pieces 53, 55 must be within a critical tolerance to ensure a proper bonding layer. Preform 57 preferably has at least two warp-fiber layers and a thickness of about 0.050", or may have more layers, increasing the thickness of preform 57. The thickness of preform 57 may be increased to ¼" or beyond and may involve the use of thicker fibers. However, the weight of the extra adhesive used in a thicker preform would likely mean that thicker preforms would be reserved for applications where minimization of weight is not a primary concern, for example, in construction of boats. Though a vacuum bag can be used when a preform is used as a bond ply, mechanical pressure may provide the necessary force during curing of the adhesive.

In FIG. 5, a metal, T-shaped piece 67 is bonded to a cured, planar piece 69 using a 3-D, woven preform 71 infused with adhesive. The assembly allows for out-of-plane tension loads to be exerted on piece 67 that are transferred to piece 69. As described above for FIG. 4, the multi-layered, rectangular cross-section of preform 71 allows for a larger dimensional tolerance between pieces 67, 69. Lower surface 73 of piece 67 is bonded to upper surface 75 of preform 71, while upper surface 77 of piece 69 is bonded to lower surface 79 of preform 71. Use of preform 71 allows for some misalignment of pieces 67, 69 when bonding and can accommodate dimensional variations in pieces 67, 69 or surfaces 73, 77. After curing, a second planar piece 79 can be attached to piece 67 using fastener 81. While piece 67 is shown as being formed from metal, it may also be formed from composites.

The advantages of the present invention include the increased strength from using an adhesive, rather than a resin, within a 3-D woven preform used to connect components. Another advantage is the reduction of steps needed to complete the assembly. By infusing the adhesive into preforms, pieces can be joined without the need for a separate adhesive film being inserted between a resin-infused connector and the pieces to be joined. Also, the thickness of the preform allows for a larger dimensional tolerance at the bond line, while providing the strength of fiber-reinforced adhesive.

While the invention has been shown in only some of its forms, it is not thus limited but is susceptible to various changes and modifications without departing from the spirit thereof. For example, a cross-shaped preform may be used, or the preform may have more than two legs extending from the base.

I claim:

1. A method for bonding two components orthogonally relative to each other, the method comprising:

(a) providing a resin-free woven preform with a base and a pair of legs extending from the base generally parallel to each other;
(b) infusing the woven preform with an adhesive;
(c) adhering opposing surfaces of one of the components to the inner surfaces of the legs of the preform;
(d) adhering a surface of the base of the preform to a surface of the other of the components and positioning the components orthogonal relative to each other; then
(e) curing the adhesive.

2. The method of claim 1, wherein:
the adhesive has a tensile strength less than 6500 pounds per square inch.

3. The method of claim 1, wherein:
step (e) further comprises enclosing the preform and portions of the components in contact with the preform within a collapsible container and drawing air from within the container, air pressure outside of the container collapsing the container and applying forces to the preform and portions of the components during curing.

4. The method of claim 1, wherein:
step (e) further comprises distributing inward forces across outer surfaces of the preform.

5. A method for bonding two components orthogonally relative to each other, the method comprising:
(a) providing a resin-free woven preform with a base and a pair of legs extending from the base generally parallel to each other;
(b) infusing the woven preform with an adhesive;
(c) adhering opposing surfaces of one of the components to the inner surfaces of the legs of the preform;
(d) adhering a surface of the base of the preform to a surface of the other of the components and positioning the components orthogonal relative to each other; then
(e) curing the adhesive; and wherein:
the adhesive has a peel strength greater than 15 pounds per linear inch.

6. A method for assembling two components, one of the components being planar, the method comprising:
(a) providing a resin-free, woven, T-shaped preform with a single leg extending from a base;
(b) infusing the preform with an adhesive, the adhesive having a tensile strength of less than 6500 pounds per square inch;
(c) adhering a lower surface of the preform to a surface of the planar component;
(d) supporting the leg of the preform in an upright orientation; then
(e) curing the adhesive; and
(f) securing the other of the components to the leg of the preform with a fastener.

7. The method of claim 6, wherein:
step (d) further comprises using tooling to support the leg of the preform.

8. The method of claim 6, wherein:
step (e) further comprises using tooling to distribute inward force across outer surfaces of the preform.

9. A method for assembling two components, one of the components being planar, the method comprising:
(a) providing a resin-free, woven, T-shaped preform with a single leg extending from a base;
(b) infusing the preform with an adhesive, the adhesive having a tensile strength of less than 6500 pounds per square inch;
(c) adhering a lower surface of the preform to a surface of the planar component;
(d) supporting the leg of the preform in an upright orientation; then
(e) curing the adhesive;
(f) securing the other of the components to the leg of the preform with a fastener; and
wherein:
the adhesive has a peel strength greater than 15 pounds per linear inch.

* * * * *